US008432795B2

(12) United States Patent
Takagi et al.

(10) Patent No.: US 8,432,795 B2
(45) Date of Patent: Apr. 30, 2013

(54) RADIO COMMUNICATION SYSTEM, RADIO COMMUNICATION METHOD AND BASE STATION

(75) Inventors: Yukiko Takagi, Yokosuka (JP); Akihito Hanaki, Yokohama (JP); Takahiro Hayashi, Yokosuka (JP); Junichiro Kawamoto, Tokyo (JP); Yoshikazu Goto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 278 days.

(21) Appl. No.: 12/390,615

(22) Filed: Feb. 23, 2009

(65) Prior Publication Data

US 2009/0225656 A1 Sep. 10, 2009

(30) Foreign Application Priority Data

Feb. 25, 2008 (JP) ................................ P2008-043613

(51) Int. Cl.
*H04L 12/26* (2006.01)

(52) U.S. Cl.
USPC ........................................................ 370/229

(58) Field of Classification Search .................. 370/282, 370/329, 342, 347, 395.4, 412, 442, 469, 370/229, 235, 466, 338; 455/67.11, 67.13, 455/69, 12.1; 270/229, 235, 282, 329, 342, 270/347, 395.4, 412, 442, 469
See application file for complete search history.

(56) References Cited

U.S. PATENT DOCUMENTS

| | | | | |
|---|---|---|---|---|
| 5,982,762 A * | 11/1999 | Anzai et al. | ................. | 370/338 |
| 6,141,534 A * | 10/2000 | Snell et al. | .................... | 455/12.1 |
| 6,219,339 B1 * | 4/2001 | Doshi et al. | ................... | 370/235 |
| 6,469,991 B1 * | 10/2002 | Chuah | ........................... | 370/329 |
| 6,876,666 B1 * | 4/2005 | Engdahl | ....................... | 370/466 |
| 2003/0133457 A1 * | 7/2003 | Ono et al. | .................... | 370/395.4 |
| 2004/0203448 A1 * | 10/2004 | Nagata | ........................ | 455/67.11 |
| 2006/0003703 A1 * | 1/2006 | Yahagi | ............................ | 455/69 |
| 2006/0104240 A1 * | 5/2006 | Sebire et al. | ................. | 370/329 |
| 2006/0114877 A1 * | 6/2006 | Heo et al. | ..................... | 370/342 |
| 2006/0215550 A1 * | 9/2006 | Malhotra | ...................... | 370/229 |
| 2006/0215604 A1 | 9/2006 | Mueckenheim et al. | | |
| 2008/0008093 A1 * | 1/2008 | Wang et al. | ................... | 370/235 |

FOREIGN PATENT DOCUMENTS

| | | |
|---|---|---|
| EP | 1 816 879 A1 | 8/2007 |
| JP | 2001-517893 A | 10/2001 |
| JP | 2003-319458 A | 11/2003 |
| JP | 2004-260241 A | 9/2004 |
| JP | 2005-039722 A | 2/2005 |
| JP | 2006-025112 A | 1/2006 |
| JP | 2006-129044 A | 5/2006 |

(Continued)

OTHER PUBLICATIONS

3GPP TS 25.321 V7.5.0 (Jun. 2007), 3rd Generation Partnership Project; Technical Specification Group Radio Access Network; Medium Access Control (MAC) protocol specification (Release 7), 141 pages.

(Continued)

*Primary Examiner* — Raj Jain
(74) *Attorney, Agent, or Firm* — Marvin A. Motsenbocker; Mots Law, PLLC

(57) ABSTRACT

A base station according to the present invention includes: a detecting unit configured to detect a discard of the uplink user data received from a radio terminal; and a scheduling unit configured to transmit an AG or an RG instructing a decrease of an SG assigned to the radio terminal, when the discard of the uplink user data is detected by the detecting unit.

10 Claims, 8 Drawing Sheets

FOREIGN PATENT DOCUMENTS

| | | |
|---|---|---|
| JP | 2006-203305 A | 8/2006 |
| JP | 2006-518173 A | 8/2006 |
| WO | 99/16185 A1 | 4/1999 |
| WO | 2004/275596 A2 | 9/2004 |
| WO | 2006/075951 A1 | 7/2006 |

OTHER PUBLICATIONS

Chinese office action issued on Aug. 15, 2011 in the counterpart Chinese patent application.

Extended European search report issued on Oct. 18, 2011 in the counterpart European patent application.

Official action issued on May 8, 2012 in the counterpart Japanese patent application.

Chinese office action issued on Jan. 29, 2012 in the counterpart Chinese patent application.

Japanese office action issued on Sep. 11, 2012 in the counterpart Japanese patent application.

* cited by examiner

RADIO COMMUNICATION SYSTEM, RADIO COMMUNICATION METHOD AND BASE STATION

CROSS REFERENCE TO RELATED APPLICATION

This application is based upon and claims the benefit of priority from prior Japanese Patent Application No. 2008-043613, filed on Feb. 25, 2008; the entire contents of which are incorporated herein by reference.

BACKGROUND OF THE INVENTION

1. Field of the Invention

The present invention relates to a radio communication system, a radio communication method, and a base station, in which a radio terminal transmits uplink user data to a base station via an enhanced dedicated physical data channel and the base station transmits transmission rate control data for controlling a transmission rate of the uplink user data to the radio terminal.

2. Description of the Related Art

Heretofore, a radio communication system including a base station and a radio network controller has been known. In such radio communication system, the base station has a single or multiple cells, and a radio communication is performed between each of the cells and a plurality of radio terminals. The radio network controller controls a plurality of base stations, and assigns a radio resource to the plurality of the radio terminals. Note that such a technique (hereinafter referred to as first technique) is sometimes referred to as R99 (Release 99) or the like.

For the purpose of improving the throughput and reducing the delay time, and the like, there has recently been proposed a technique in which a base station assigns the radio resources for uplink user data transmitted from each of the radio terminals to the base station (network side). Note that such a technique (hereinafter referred to as a second technique) is sometimes referred to as the high speed uplink packet access (HSUPA), the enhanced uplink (EUL) or the like.

Each of the cells functions as a serving cell or as a non-serving cell. A transport block size (TBS) is determined based on the transmission rate (for example, a scheduling grant (SG)) of the uplink user data, and is controlled by transmission rate control data transmitted from the serving cell and the non-serving cell. The transmission rate control data includes an absolute grant (AG) for controlling an absolute value of the transmission rate and a relative grant (RG) for controlling a relative value of the transmission rate (for example, see 3GPP T325.321 Ver. 7.5.0).

In this regard, in the above-described second technique, the base station stores, in the buffer, the uplink user data that is received from the mobile terminal via an enhanced dedicated physical data channel (E-DPDCH), and thereafter transmits the uplink user data to the radio network controller. Note that, the base station transmits the uplink user data to the radio network controller by use of a wired transmission path.

Incidentally, when the uplink user data stored in the buffer of the base station is discarded, a retransmission of the uplink user data is required. Similarly, when the uplink user data transmitted by use of the wired transmission path is discarded, a retransmission of the uplink user data is required.

When the above-described retransmission of the uplink user data is required to be performed, an amount of the uplink user data transmitted from the mobile terminal to the base station increases, thereby a delay of the uplink user data and a decrease of the throughput in the uplink user data occur.

SUMMARY OF THE INVENTION

A first aspect of the present invention is summarized as a radio communication system in which a radio terminal transmits uplink user data to a base station via an enhanced dedicated physical data channel and in which the base station transmits, to the radio terminal, transmission rate control data for controlling a transmission rate of the uplink user data. The base station includes: a detecting unit (detecting units 126 and 127) configured to detect a discard of so the uplink user data received from the radio terminal; and a first transmission unit (a communication unit 110 and a scheduling unit 120a) configured to transmit transmission rate decrease data being the transmission rate control data instructing a decrease of the transmission rate assigned to the radio terminal, when the discard of the uplink user data is detected.

According to this aspect, the first transmission unit transmits the transmission rate decrease data to the radio terminal, when the detecting unit detects the discard of the uplink user data. Accordingly, it is possible to prevent a delay of the uplink user data and a decrease of the throughput in the uplink user data.

In the above-described first aspect, the base station further includes a buffer (a buffer 125) configured to store the uplink user data received from the radio terminal. The detecting unit detects the discard of the uplink user data stored in the buffer.

In the above-described first aspect, the base station further includes a second transmission unit (a communication unit 110) configured to transmit the uplink user data to a network side via a wired transmission path, and a receiving unit (the communication unit 110) configured to receive, from the network sides congestion information indicating an occurrence of a congestion in the wired transmission path. The detecting unit detects the discard of the uplink user data in accordance with the congestion information.

In the above-described first aspect, the buffer is formed of a plurality of buffers (buffers 125a to 125c). The first transmission unit transmits the transmission rate decrease data to the radio terminal corresponding to one of the plurality of buffers in which the uplink user data is discarded.

In the above-described first aspect the wired transmission path is formed of a plurality of wired transmission paths. The first transmission unit transmits the transmission rate decrease data to the radio terminal corresponding to one of the plurality of wired transmission paths in which the uplink user data is discarded.

A second aspect of the present invention is summarized as a radio communication method in which a radio terminal transmits uplink user data to a base station via an enhanced dedicated physical data channel and in which the base station transmits, to the radio terminal, transmission rate control data for controlling a transmission rate of the uplink user data. This method includes: detecting, at the base station, a discard of the uplink user data received from the radio terminal; and transmitting, at the base station, transmission rate decrease data being the transmission rate control data instructing a decrease of the transmission rate assigned to the radio terminal, when the discard of the uplink user data is detected.

A third aspect of the present invention is summarized as a base station that receives uplink user data from a radio terminal via an enhanced dedicated physical data channel, and transmits, to the radio terminal, transmission rate control data for controlling a transmission rate of uplink user data. The base station includes: a detecting unit (detecting units 126 and 127) configured to detect a discard of the uplink user data received from the radio terminal; and a first transmission unit (a communication unit 110, a scheduling unit 120a) configured to transmit transmission rate decrease data being the transmission rate control data instructing a decrease of the transmission rate assigned to the radio terminal, when the discard of the uplink user data is detected.

DESCRIPTION OF THE EMBODIMENTS

Figure 1:
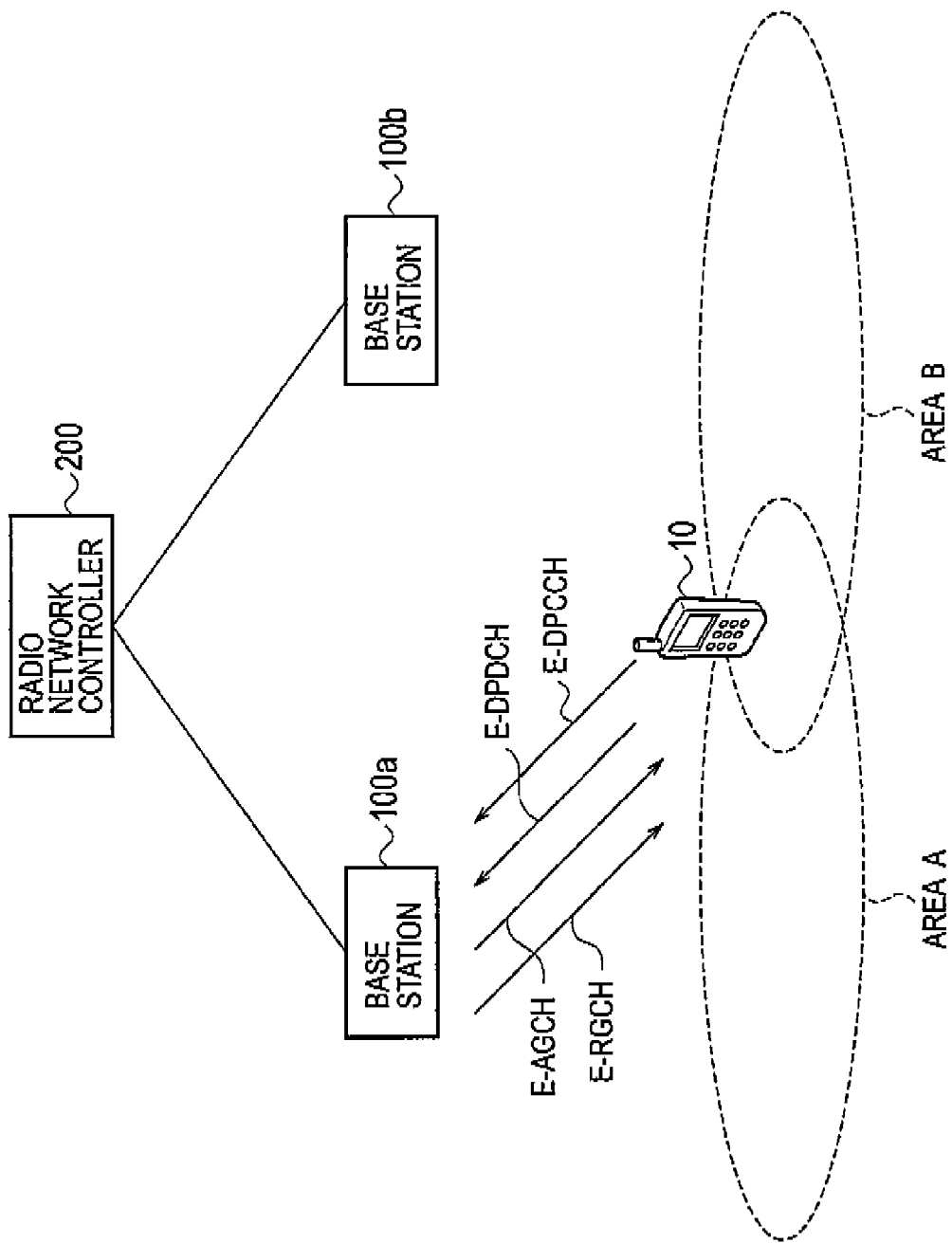
FIG. 1 is a view showing a radio communication system according to a first embodiment.

With reference to the accompanying drawings, a radio communication system according to the embodiments of the present invention will be described below. Note that, in the following description of the drawings, the same or similar parts will be denoted by the same or similar reference numerals.

However, it should be noted that the drawings are schematic and ratios of dimensions and the like are different from actual ones. Therefore, specific dimensions and the like should be determined by taking into consideration the following description. Moreover, as a matter of course, also among the drawings, there are included portions in which dimensional relationships and ratios are different from each other.

First Embodiment

Configuration of Radio Communication System

With reference to the accompanying drawings, a configuration of a radio communication system according to a first embodiment will be described below. FIG. 1 is a view showing the radio communication system according to the first embodiment. As shown in FIG. 1, the radio communication system includes a radio terminal 10, a base station 100 (a base station 100a and a base station 100b), and a radio network controller 200.

The radio terminal 10 transmits uplink user data to the base station 100a. Specifically, the radio terminal 10 transmits the uplink user data to the base station 100 via a dedicated physical data channel (DPDCH) in a framework in which the radio network controller 200 assigns radio resources and the like. Note that this framework is sometimes referred to as the R99 (Release 99) or the like.

In this framework, the radio terminal 10 transmits the uplink control data to the base station 100a via a dedicated physical control channel (DPCCH).

Note that a transmission power of the DPCCH is controlled by a TPC command received from the base station 100, as in the case of general closed loop power controls. The TPC command is referred to a command generated by the base station 100 based on a comparison between a reception quality of an uplink signal and a target quality.

Meanwhile, the radio terminal 10 transmits uplink user data to the base station 100a via an enhanced dedicated physical data channel (E-DPDCH), in a framework in which the base station 100 assigns radio resources and the like. Note that this framework is sometimes referred to as the high speed uplink packet access (HSUPA), the enhanced uplink (EUL) or the like.

Here, the uplink user data is divided into blocks for each transmission time interval (TTI), that is, for each processes (HARQ process). Each of the blocks (MAC-e PDU) is transmitted by use of a process (hereinafter referred to as an active process) assigned to the radio terminal 10.

Moreover, a predetermined number of processes (process #1 to process #n) forms a cyclic period (HARQ RTT) and the cyclic period is repeated. Note that the number of processes included in the cyclic period is determined according to a TTI length. For example, when the TTI length is 2 ms, the number of processes included in the cyclic period is "8". When the TTI length is 10 ms, the number of processes included in the cyclic period is "46".

Here, the radio terminal 10 has a table associating a transmission power ratio with the transmission rate. This table is used for transmitting the uplink user data via the E-DPDCH. The transmission power ratio is a ratio of a transmission power of the E-DPDCH to a transmission power of the DPCCH (E-DPDCH/DPCCH). The transmission rate is represented by a transport block size (TBS).

The transmission power ratio assigned to the radio terminal 10 will be hereinafter referred to as a scheduling grant (SG). Note that the transmission power ratio and the transmission rate are associated one-to-one with each other. Thus, the scheduling grant (SG) may be considered not only as a term representing the transmission power ratio assigned to the radio terminal 10 but also as a term representing the transmission rate assigned to the radio terminal 10.

Note that, as will be described later, the radio terminal 10 updates the SG according to transmission rate control data (AG or RG) received from the base station 100a (see 3GPP TS25.321 Ver. 7.5.0 11.8.1.3 "Scheduling grant Update"). Subsequently, the radio terminal 10 determines a transmission rate (that is, TBS) corresponding to the SG by referring to the table associating the transmission power ratio with the transmission rate (see 3GPP TS25.321 Ver. 7.5.0 11.8.1.4 "E-TFC Selection").

In the framework in which the base station 100 assigns the radio resources and the like, the radio terminal 10 transmits uplink control data to the base station 100a via the enhanced dedicated physical control channel (E-DPCCH) or the like.

The base station 100 receives the uplink user data from the radio terminal 10, via the E-DPDCH. Further, the base station 100 transmits the uplink user data to the network side (radio network controller 200), via a wired transmission path (bearer).

Figure 2:
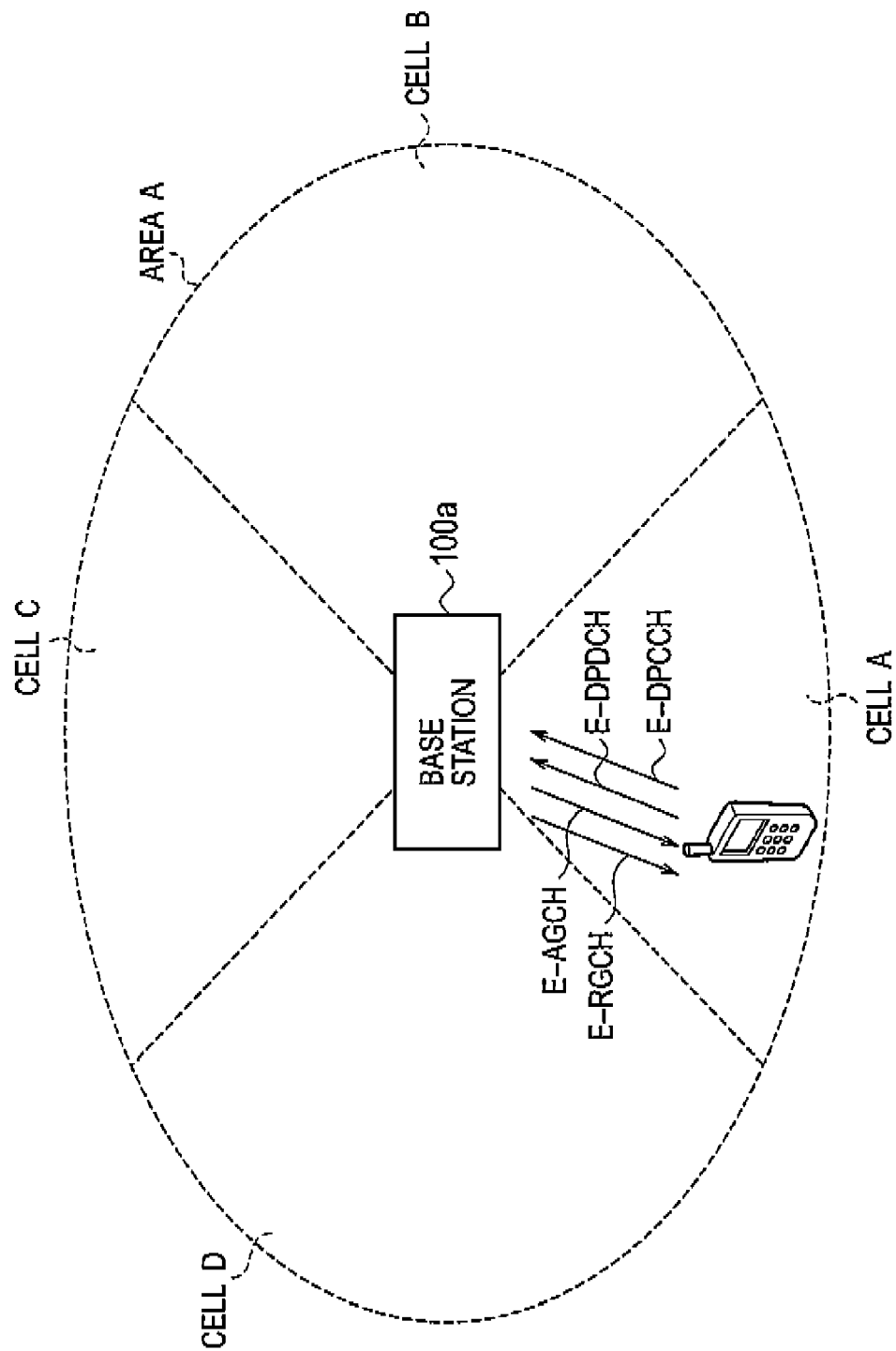
FIG. 2 is a view showing the radio communication system according to the first embodiment.

As shown in FIG. 2, the base station 100a controls a plurality of cells (cells A to D), and each of the plurality of cells communicates with the radio terminal 10 located in the each of the plurality of cells. Each of the cells can function as a serving cell, or a non-serving cell.

Note that the "cell" is basically used as a term representing a function communicating with the radio terminal 10. The "cell" is sometimes used as a term representing an area within which the radio terminal 10 is located.

For example, in FIG. 2, the radio terminal 10a performs a communication according to an instruction from an EUL scheduler provided in the cell A (in other words, the radio terminal performs a communication according to an AG received from the cell A via the E-AGCH). In this example, the cell A is a serving cell for the radio terminal 10a and the cells B to D are non-serving cells for the radio terminal 10a. Meanwhile, the radio terminal 10a is referred to as a serving terminal for the cell A and as a non-serving terminal for the cells B to D.

The base station 100a receives the uplink user data from the radio terminal 10 via the data channel such as the DPDCH or the E-DPDCH. Meanwhile, the base station 100a transmits, to the radio terminal 10, transmission rate control data for controlling a transmission rate of the uplink user data to be transmitted via the E-DPDCH. Note that the transmission rate control data includes an absolute grant (AG) for controlling an absolute value of the transmission rate, and a relative grant (RG) for controlling a relative value of the transmission rate.

The absolute grant (AG) is data (Index) directly specifying the transmission power ratio (E-DPDCH/DPCCH) to be assigned to the radio terminal 10 (see 3GPP T825.212 Ver. 7.5.0 4.10.1A.1 "Information field mapping of the Absolute Grant Value").

As described above, the absolute grant (AG) is a command directly specifying the transmission rate value without relying on the current transmission rate.

The relative grant (RG) is data ("Up", "Down" and "Hold") relatively specifying the transmission power ratio (E-DPDCH/DPCCH) assigned to the radio terminal 10 (see 3GPP TS25.321 Ver. 7.5.0 9.2.5.2.1 "Relative Grants").

As described above, the relative grant (RG) is a command relatively controlling the current transmission rate. Specifically, the relative grant (RG) includes an increase command "Up" for instructing an increase of the current transmission rate, a retention command "Hold" for instructing a retention of the current transmission rate, and a decrease command "Down" for instructing a decrease of the current transmission rate. Here, the increase command instructs the increase of the transmission rate by a predetermined amount. Further, the decrease command instructs the decrease of the transmission rate by a predetermined amount. The predetermined amount for the increase may be the same as or smaller than the predetermined amount for the decrease.

The base station 100a transmits the absolute grant (AG) to the radio terminal 10 via the E-DCH absolute grant channel (E-AGCH) The base station 100a transmits the relative grant (RG) to the radio terminal 10 via the E-DCH relative grant channel (E-RGCH).

For example, the serving cell (here, the cell A) transmits the AG to the radio terminal 10 via the E-AGCH and transmits the RG to the radio terminal 10 via the E-RGCH. Meanwhile, the non-serving cell (here, the cell B) transmits the RG to the radio terminal 10 via the E-RGCH without transmitting the AG to the radio terminal 10 via the E-AGCH.

It should be note that, in FIG. 1, the channels (the DPDCH, the DPCCH and the like) used in the R99 are merely omitted for simplifying the description. It should also be noted that multiple number of the radio terminals 10 existed in each of the cells are omitted in the description.

Further, the cell used as the serving cell by the radio terminal 10 is not limited to one cell but may be more than one cell (Configuration of Base Station)

Figure 3:
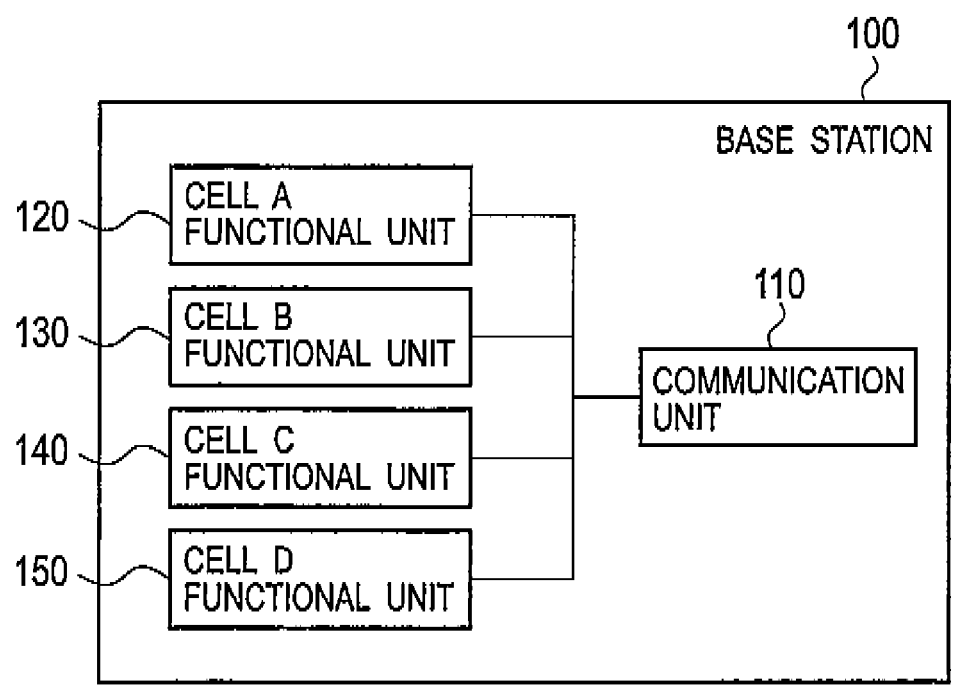
FIG. 3 is a block diagram showing a base station 100 according to the first embodiment.

With reference to the accompanying drawings, description will be given of a configuration of the base station according to the first embodiment. FIG. 3 is a block diagram showing the base station 100 according to the first embodiment.

As shown in FIG. 3, the base station 100 includes a communication unit 110, a cell A functional unit 120, a cell B functional unit 130, a cell C functional unit 140 and a cell D functional unit 150.

The communication unit 110 communicates with the radio terminal 10 located in the cells A to D. Here, the plurality of the radio terminals 10 is located in the cells A to D, respectively. Specifically, the communication unit 110 receives uplink user data from each of the plurality of radio terminals 10 via the data channel such as the DPDCH or the E-DPDCH. Further, the communication unit 110 receives uplink control data from each of the plurality of radio terminals 10 via the control channel such as the DPDCH or the E-DPCCH. Meanwhile, the communication unit 110 transmits transmission rate control data (such as AG. RG, or the like) to each of the plurality of radio terminals 10 via the control channel such as the E-AGCH and the E-RGCH.

Note that the communication unit 110 also communicates with the network side (such as a radio network controller 200, a switching apparatus or the like), which controls the base station 100. More specifically, the communication unit 110 transmits the uplink user data to the radio network controller 200 via the wired transmission path established between the base station 100 and the radio network controller 200.

The cell A functional unit 120 functions as a serving cell for radio terminals 10 located in the cell A. Meanwhile, the cell A functional unit 120 functions as a non-serving cell for radio terminals 10 located in the cells B to D.

The cell B functional unit 130 functions as a serving cell for radio terminals 10 located in the cell B. Meanwhile, the cell B functional unit 130 functions as a non-serving cell for radio terminals 10 located in the cells A, C and D.

The cell C functional unit 140 functions as a serving cell for radio terminals 10 located in the cell C. Meanwhile, the cell C functional unit 140 functions as a non-serving cell for radio terminals 10 located in the cells A, B and D.

The cell D functional unit 150 functions as a serving cell for radio terminals 10 located in the cell D. Meanwhile, the cell D functional unit 150 functions as a non-serving cell for radio terminals 10 located in the cells A to C.

(Configuration of Cell)

Figure 4:
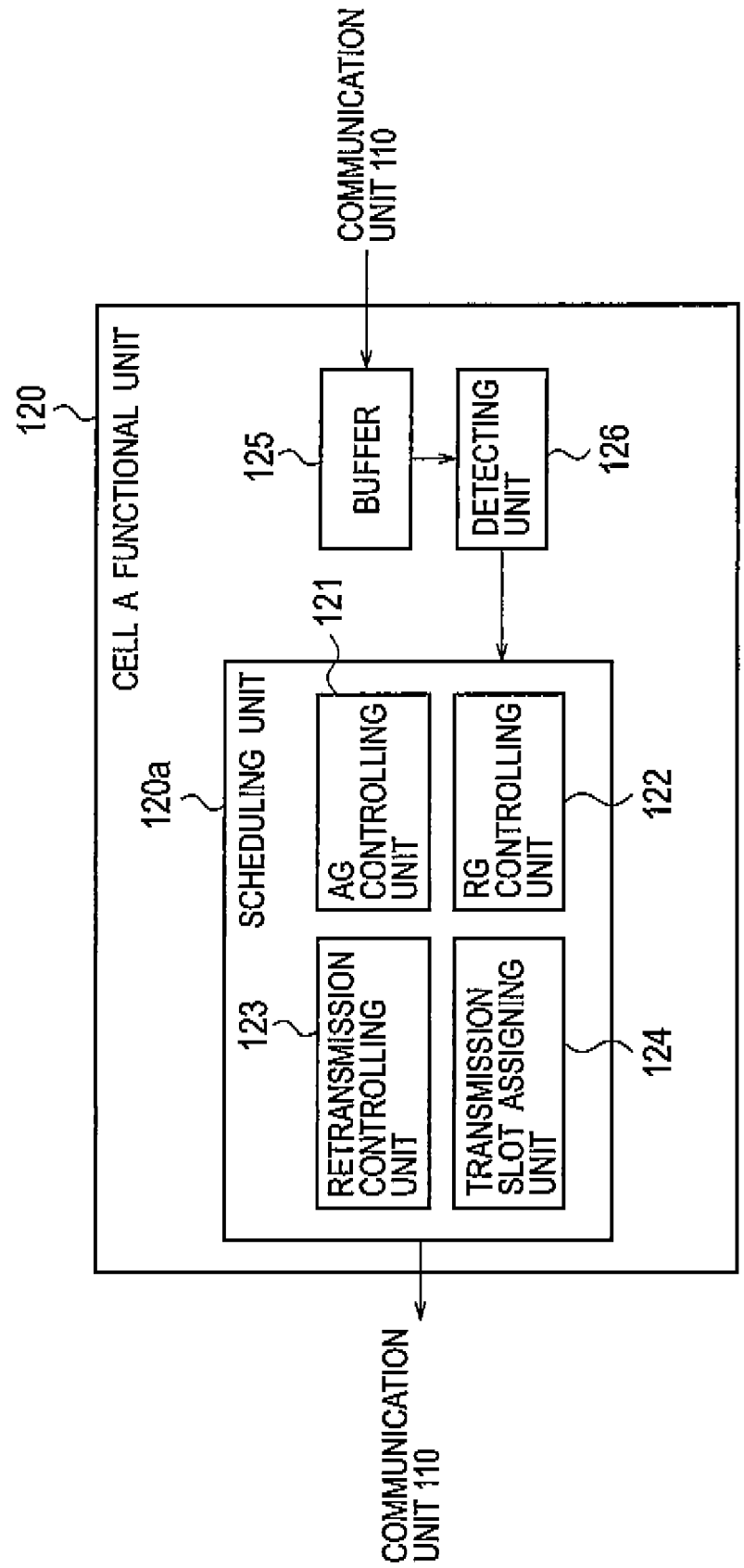
FIG. 4 is a block diagram showing a cell A functional unit 120 according to the first embodiment.

With reference to the accompanying drawings, description will be given of a configuration of the cell according to the first embodiment. FIG. 4 is a block diagram showing the cell (the cell A functional unit 120) according to the first embodiment. Here, description will be given for an example in which the cell A functional unit 120 functions as a serving cell.

As shown in FIG. 4, the cell A functional unit 120 includes: a scheduling unit 120a, a buffer 125, and a detecting unit 126.

The scheduling unit 120a includes an AG controlling unit 121, an RG controlling unit 122, a retransmission controlling unit 123 and a transmission slot assigning unit 124. The scheduling unit 120a is operated in a MAC-e (Media Access Control Enhanced) layer.

The AG controlling unit 121 transmits an AG via the E-AGCH to the radio terminal 10. Note that the AG is a command for directly specifying a value of the transmission rate without relying on the current transmission rate.

The RG controlling unit 122 transmits an RG via the E-RGCH to the radio terminal 10 (serving radio terminal of the cell A). Note that the RG includes the increase command "Up" for instructing the increase of the current transmission rate, the retention command "Hold" for instructing the retention of the current transmission rate, and the decrease command "Down" for instructing the decrease of the current transmission rate. As described above, the increase command "Up" instructs the increase of the transmission rate by a predetermined amount and the decrease command "Down" instructs the decrease by a predetermined amount. The predetermined amount for the increase may be the same as or smaller than the predetermined amount for the decrease.

The retransmission controlling unit 123 determines, for each block (for each process), whether or not an error in the uplink user data occurred. Thereafter, the retransmission controlling unit 123 requests the radio terminal 10 to retransmit a block in which the error occurred (hereinafter referred to as an error block). Here, a retransmission control technique is a HARQ (Hybrid Automatic Repeat Request) technique for combining a block firstly transmitted from the radio terminal 10 (hereinafter referred to as a transmission block) with a block retransmitted from the radio terminal 10 (hereinafter referred to as a retransmission block).

Note that, when the detecting unit 126 detects the discard of the uplink user data (transmission block or retransmission block), the retransmission controlling unit 123 request the radio terminal 10 to retransmit the discarded uplink user data (transmission block or retransmission block).

The transmission slot assigning unit 124 assigns, to the radio terminal 10, a transmission slot (that is, a process included in one TTI) to be used for transmitting the uplink user data (block) via the E-DPDCH. Note that the radio terminal 10 transmits the transmission block or the retransmission block to the base station 100 by using the process (active process) assigned by the transmission slot assigning unit 124.

The buffer 125 stores the uplink user data (block) received from the radio terminal 10 via the E-DPDCH. A buffer amount threshold indicating an amount of the uplink user data that can be stored in the buffer 125 is preliminary determined.

When the amount of the uplink user data exceeds the buffer amount threshold, the uplink user data (block) received from the radio terminal 10 is discarded. Note that it may be configured such that the uplink user data (block) stored in the buffer 125 is discarded in the order from the oldest block, or in the order from the newest block. Alternatively, the uplink user data (block) stored in the buffer 125 may be discarded in the order from the block having the lowest priority.

The detecting unit 126 detects that the discard of the uplink user data (block) in the buffer. Further, the detecting unit 126 notifies, to the scheduling unit 120a, the discard of the uplink user data (block).

When the scheduling unit 120a is notified of the discard of the uplink user data (block), the scheduling unit 120a transmits, to the radio terminal 10, transmission rate control data (transmission rate decrease data) for instructing a decrease of the SG assigned to the radio terminal 10.

More specifically, the scheduling unit 120a counts up a discard continuation counter for each predetermined period. The scheduling unit 120a sets the value of the discard continuation counter to be "0" (reset the counter) when the scheduling unit 120a is notified of the discard of the uplink user data (block).

The scheduling unit 120a continuously transmits the transmission rate decrease data to the radio terminal 10, while the value of the discard continuation counter is less than a discard continuation threshold. In other words, the scheduling unit 120a continuously transmits the transmission rate decrease data to the radio terminal 10, from an occurrence of the discard of the uplink user data (block) until the value of the discard continuation counter reaches the discard continuation threshold.

For example, the AG controlling unit 121 transmits, to the radio terminal 10, as the transmission rate decrease data, an AG specifying an SG lower than the SG (current SG) assigned to the radio terminal 10. In this regard, the AG may be data specifying a specific value (SG) that is smaller than the current SG, or data specifying the SG that is smaller than the current SG by a predetermined amount. Further, the AG controlling unit 121 may transmit, to the radio terminal 10, the AG ("Inactive") that limits a use of the active process assigned to the radio terminal 10.

The RG controlling unit 122 may transmit, to the radio terminal 10, as the transmission rate decrease data, an RG (decrease command "Down") for instructing a decrease of the SG (Operations of Base Station (Cell))

Figure 5:
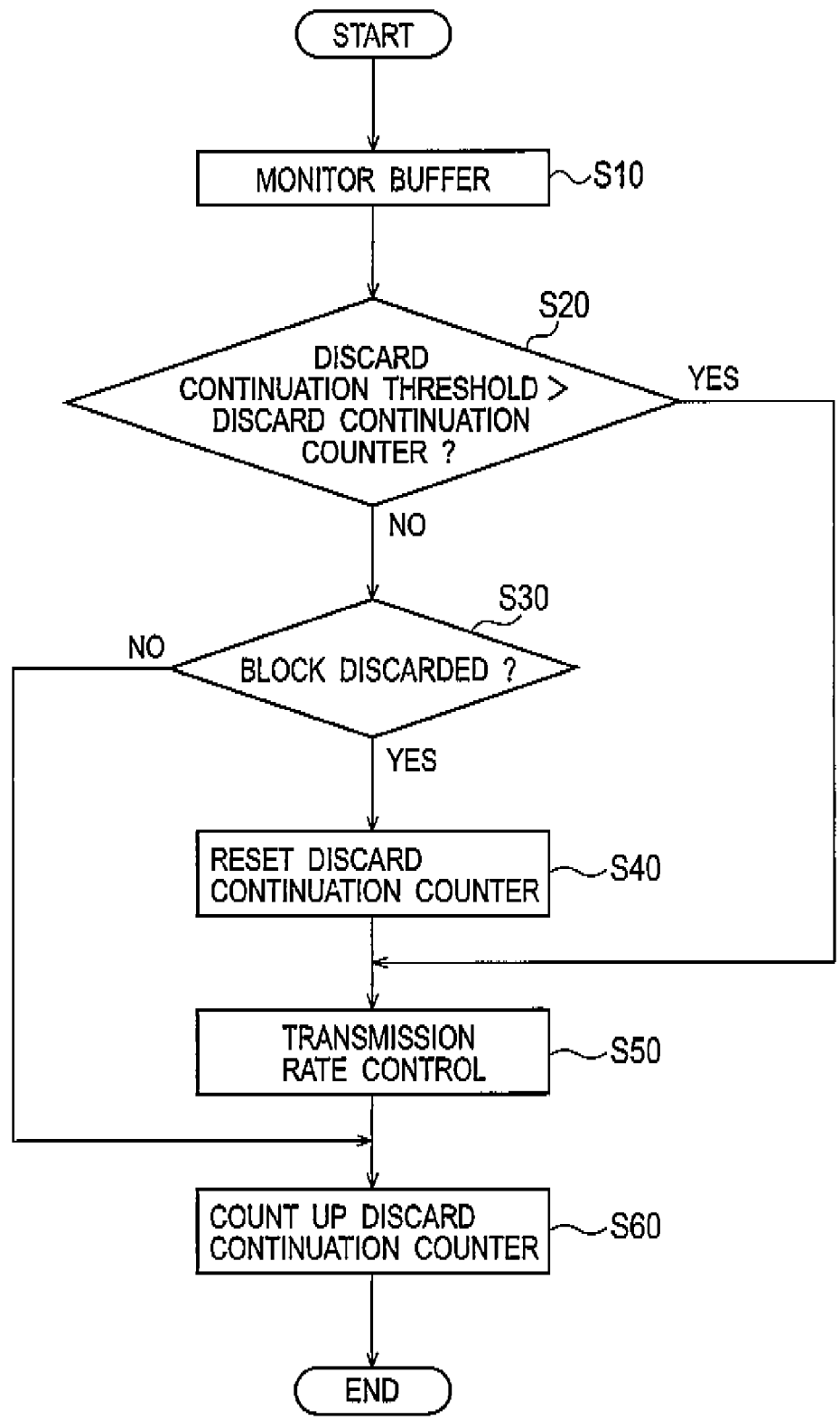
FIG. 5 is a flowchart showing an operation of a base station 100 (cell) according to the first embodiment.

With reference to the drawing, description will be given below of operations of the base station (cell) according to the first embodiment. FIG. 5 is a flowchart showing operations of the base station 100 (cell) according to the first embodiment. It should be noted that the processes shown in FIG. 5 are repeated by a predetermined period.

As shown in FIG. 5, in Step 10, the base station 100 monitors the amount of the uplink user data received from the radio terminal 10 via the E-DPDCH. In other words, the base station monitors the buffer 125.

In step 20, the base station 100 determines whether or not the value of the discard continuation counter is less than the discard continuation threshold. When the value of the discard continuation counter is less than the discard continuation threshold, the base station moves to the process of Step 50. Meanwhile, when the value of the discard continuation counter is not less than the discard continuation threshold, the base station moves to the process of step 30.

In step 30, the base station determines whether or not the discard of the uplink user data (block) is detected. When the base station determines that the discard of the uplink user data (block) is detected, the base station moves to the process of step 40. Meanwhile, when the base station determines that the discard of the uplink user data (block) is not detected, the base station moves to the process of step 60.

In step 40, the base station 100 resets the value of the discard continuation counter.

In step 50, the base station 100 transmits, to the radio terminal 10, the transmission rate control data (the transmission rate decrease data) for instructing a decrease of the SG assigned to the radio terminal 10.

For example, the AG controlling unit 121 transmits, to the radio terminal 10, as the transmission rate decrease data, an AG specifying an SG lower than the SG (current SG) assigned to the radio terminal 10. In this regard, the AG may be data specifying a specific value (SG) that is smaller than the current SG, or data specifying the SG that is smaller than the current SG by a predetermined amount.

Further, the AG controlling unit 121 may transmit, to the radio terminal 10, the AG ("Inactive") that limits the use of the active process assigned to the radio terminal 10. The RG controlling unit 122 may transmit, to the radio terminal 10, as the transmission rate decrease data, an RG (decrease command "Down") for instructing the decrease of the SG.

In step 60, the base station 100 counts up the value of the discard continuation counter.

(Operation and Effects)

According to the first embodiment, the scheduling unit 120a transmits the transmission rate decrease data to the radio terminal 10, when the detecting unit 126 detects the discard of the uplink user data. Accordingly, it is possible to prevent a delay of the uplink user data and a decrease of the throughput in the uplink user data.

More specifically, the detecting unit 126 detects the discard of the uplink user data in the buffer 125. Here, when the value of the discard continuation counter is less than the discard continuation threshold, the scheduling unit 120a transmits the transmission rate decrease data to the radio terminal 10. In other words, the scheduling unit 120a continuously transmits the transmission rate decrease data to the radio terminal 10 until the discard of the uplink user data does not occur for a predetermined period.

As a result, it is possible to prevent the uplink user data from being continuously discarded, and thereby the delay of the uplink user data and the decrease of the throughput in the uplink user data are effectively controlled.

Second Embodiment

Herein after, a second embodiment will be described with reference to the accompanying drawings. The following description is mainly given of differences between the first embodiment described above and the second embodiment.

Specifically, in the first embodiment described above, the base station 100 transmits the transmission rate decrease data to the radio terminal 10, when the uplink user data is discarded in the buffer provided in the base station 100.

Meanwhile, in the second embodiment, a base station 100 according to the second embodiment transmits the transmission rate decrease data to the radio terminal 10 when the uplink user data is discard in the wired transmission path established between the base station 100 and the radio network controller 200.

Here, it can be considered that the wired transmission path is shared by a plurality of base stations 100. The radio network controller 200 transmits, to the plurality of base stations 100, congestion information (TNL Congestion Indication) indicating whether or not a congestion is generated in the wired transmission path, (see TS25.427 Ver. 7.5.0, section 5.14 "TNL Congestion Indication")

The congestion information includes such as; (1) information indicating that the congestion is not generated, "0 NO TNL Congestion"; (2) information indicating that the congestion detected by a delay is generated, "2 TNL Congestion-detected by delay build up"; and (3) information indicating that the congestion detected by a discard of the uplink user data is generated, "3 TNL Congestion-detected by frame loss". (see TS25.427 Ver. 7.5.0, section 6.3.3.11 "TNL Congestion Indication")

(Configuration of Cell)

Figure 6:
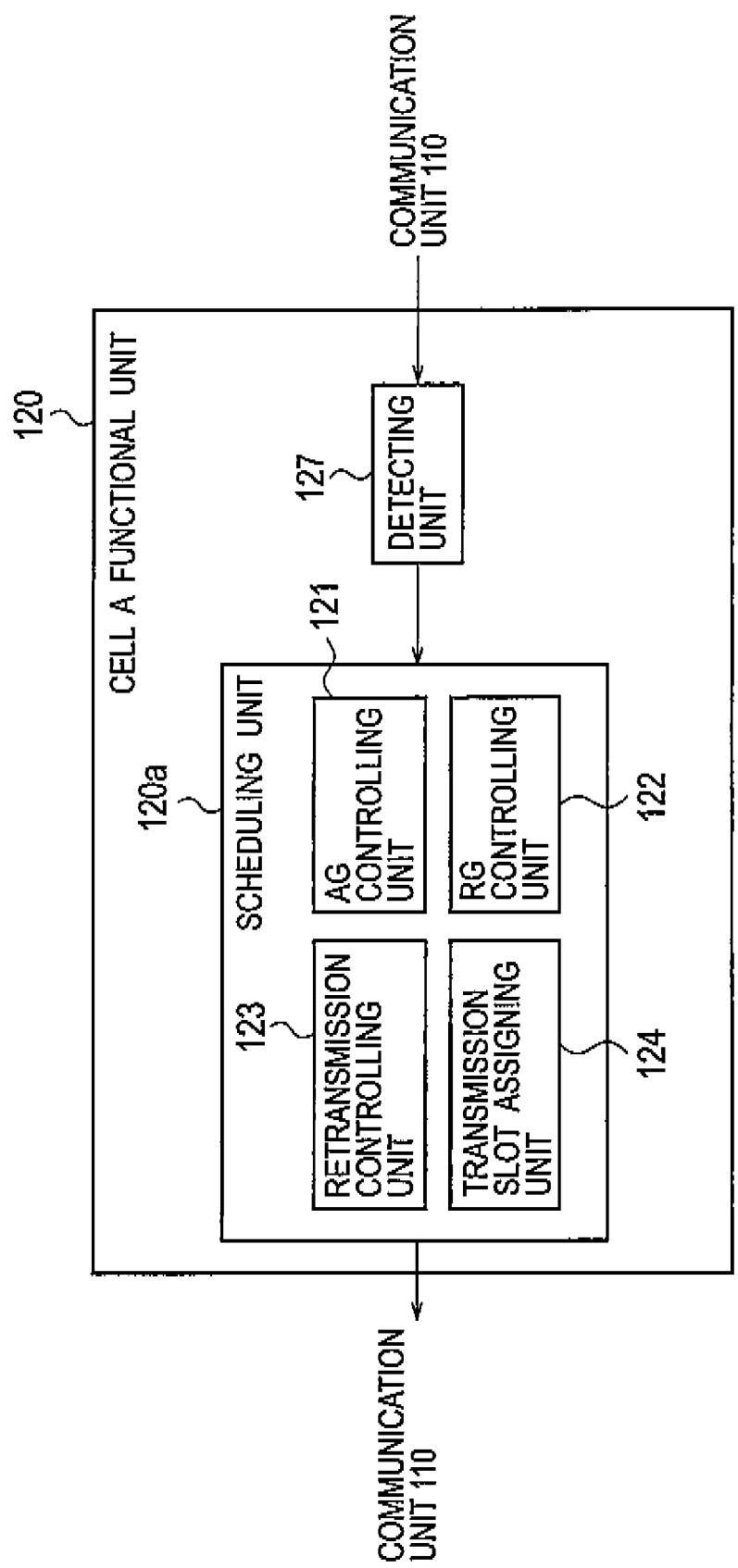
FIG. 6 is a block diagram showing a cell A functional unit 120 according to a second embodiment

Hereinafter, description will be given of a configuration of the cell according to the second embodiment, with reference to the accompanying drawings. FIG. 6 is a block diagram showing the cell (the cell A functional unit 120) according to the second embodiment. Here, description will be given for an example in which the cell A functional unit 120 functions as a serving cell. Note that, in FIG. 6, configurations having the same configuration as FIG. 4 are denoted by the same or similar reference numerals.

As shown in FIG. 6, the cell A functional unit 120 includes a detecting unit 127, instead of the buffer 125 and/or the detecting unit 126.

The detecting unit 127 detects the discard of the uplink user data (block) in the wired transmission path. More specifically, the detecting unit 127 monitors the congestion information received from the radio network controller 200. When the detecting unit 127 receives the congestion information indicating the occurrence of the congestion detected by the discard of the uplink user data, the detecting unit detects the discard of the uplink user data in the wired transmission path. Further, the detecting unit 127 notifies the scheduling unit 120a of the discard of the uplink user data (block).

When the scheduling unit 120a is notified of the discard of the uplink user data (block), as in the case of the first embodiment, the scheduling unit 120a transmits, to the radio terminal 10, the transmission rate control data (transmission rate decrease data) for instructing the decrease of the SG assigned to the radio terminal 10.

More specifically, the scheduling unit 120a counts up a discard continuation counter for each predetermined period. The scheduling unit 120a sets the value of the discard continuation counter to be "0" (reset the counter) when the scheduling unit 120a is notified of the discard of the uplink user data (block).

The scheduling unit 120a continuously transmits the transmission rate decrease data to the radio terminal 101 while the value of the discard continuation counter is less than a discard continuation threshold. In other words, the scheduling unit 120a continuously transmits the transmission rate decrease data to the radio terminal 10, from an occurrence the discard of the uplink user data (block) until the value of the discard continuation counter reaches the discard continuation threshold.

(Operations of Base Station (Cell))

Figure 7:
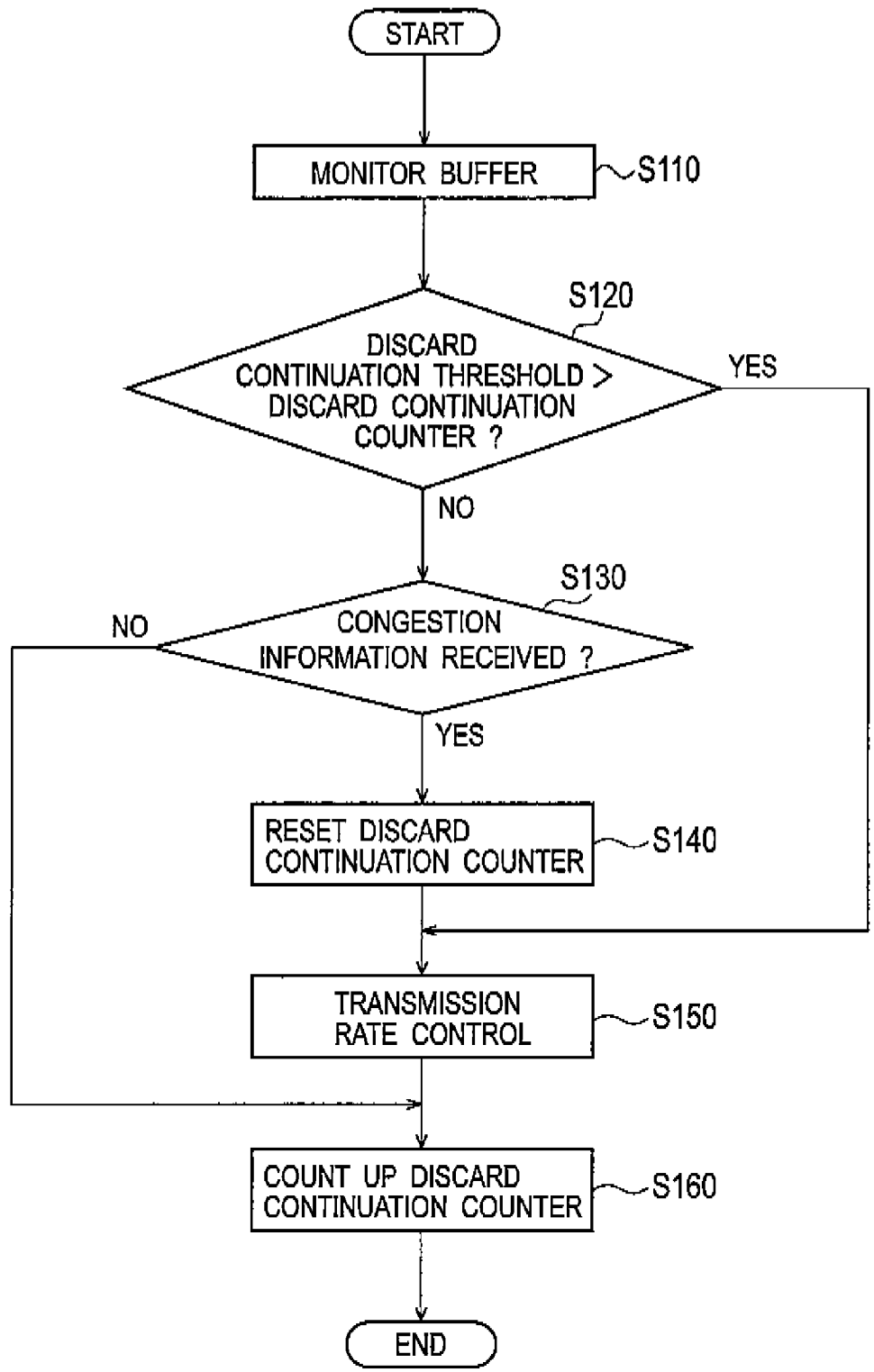
FIG. 7 is a flowchart showing operations of a base station 100 (cell) according to the second embodiment.

Hereinafter, description will be given of operations of the base station (cell) according to the second embodiment, with reference to the accompanying drawings. FIG. 7 is a flowchart showing operations of the base station 100 (cell) according to the second embodiment. It should be noted that the processes shown in FIG. 7 are repeated by a predetermined period.

As shown in FIG. 7, in Step 110, the base station 100 monitors the congestion information received from the radio network controller 200.

In step 120, the base station 100 determines whether or not the value of the discard continuation counter is less than a discard continuation threshold. When the value of the discard continuation counter is less than the discard continuation threshold, the base station moves to the process of Step 150. Meanwhile, when the value of the discard continuation counter is not less than the discard continuation threshold, the base station moves to the process of Step 130.

In step 130, the base station determines whether or not the congestion information is received from the radio network controller 200. Here, the congestion information indicates the occurrence of the congestion detected by the discard of the uplink user data. When the base station receives the congestion information from the radio network controller 200, the base station moves to the process of step 140. Meanwhile, when the base station does not receive the congestion information from the radio network controller 200, the base station moves to the process of step 160.

In step 140, the base station 100 resets the value of the discard continuation counter.

In step 150, the base station 100 transmits, to the radio terminal 10, the transmission rate control data (the transmission rate decrease data) for instructing a decrease of the SG assigned to the radio terminal 10.

In step 160, the base station 100 counts up the value of the discard continuation counter.

(Operations and Effects)

According to the second embodiment, the scheduling unit 120a transmits the transmission rate decrease data to the radio terminal 10, when the detecting unit 127 detects the discard of the uplink user data. Accordingly, it is possible to prevent a delay of the uplink user data and a decrease of the throughput in the uplink user data.

More specifically, by receiving the congestion information from the radio network controller 200, the detecting unit 127 detects the discard of the uplink user data. Here, when the value of the discard continuation counter is less than the discard continuation threshold, the scheduling unit 120a transmits the transmission rate decrease data to the radio terminal 10. In other words, the scheduling unit 120a continuously transmits the transmission rate decrease data to the radio terminal 10 until the discard of the uplink user data does not occur for a predetermined period.

As a result, it is possible to prevent the uplink user data from being continuously discarded, and thereby the delay of the uplink user data and the decrease of the throughput in the uplink user data are effectively controlled.

Third Embodiment

Hereinafter, a third embodiment will be described with reference to the accompanying drawings. The following description is mainly given of differences between the first embodiment described above and the third embodiment.

Specifically, although not particularly described in the first embodiment, in the third embodiment, a buffer 125 provided in the base station 100 is formed of a plurality of buffers. Each of the plurality of buffers corresponds to a radio terminal that establishes an E-DPDCH with a base station 100. When a plurality of E-DPDCHs is established between the radio terminal 10 and the base station 100, one radio terminal 10 may correspond to one of the plurality of buffers, or to the plurality of buffers.

(Configuration of Cell)

Figure 8:
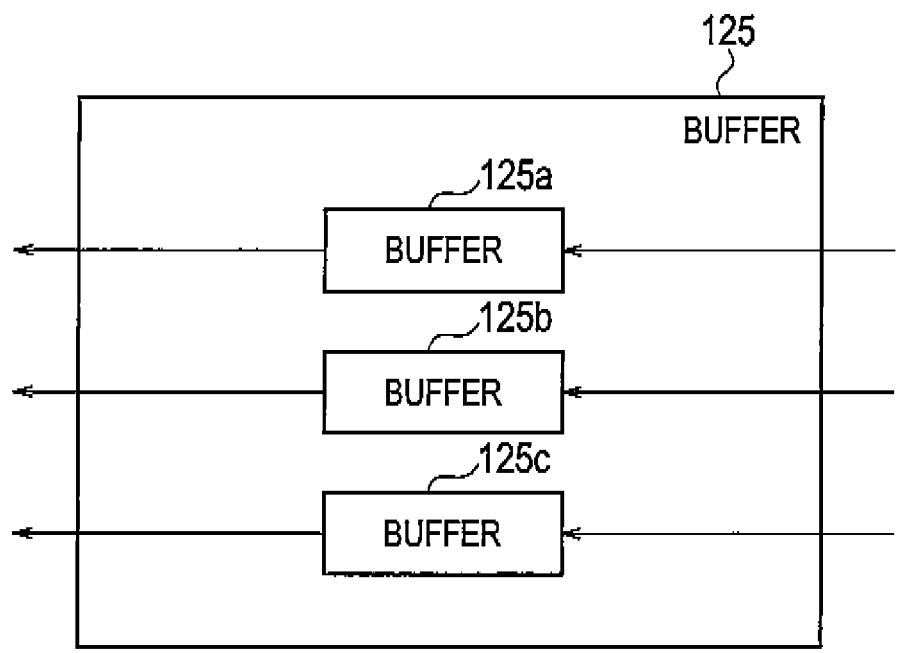
FIG. 8 is a block diagram showing a buffer 125 according to a third embodiment.

Hereinafter, description will be given of a configuration of the cell according to the third embodiment, with reference to the accompanying drawings. FIG. 8 is a block diagram showing the buffer 125 according to the third embodiment.

As shown in FIG. 8, the buffer 125 is formed of the plurality of buffers 125 (that is, buffers 125 a to 125c).

Each of the buffers 125a to 125c respectively corresponds to the radio terminal 10 that establishes the E-DPDCH with the base station 100. Each of the buffers 125a to 125c stores the uplink user data (block) received from the radio terminal 10 corresponding to the each of the buffers 125a to 125c.

In this regard, the above-described detecting unit 126 detects the discard of the uplink user data (block), for the respective buffers 125a to 125c. The detecting unit 126 notifies the scheduling unit 120a of the discard of the uplink user data (block), along with an identifier of the buffer (or an identifier of the E-DPDCH, an identifier of the radio terminal 10, or the like) in which the discard of the uplink user data (block) occurs.

The above-described scheduling unit 120a transmits the transmission rate control data only to the radio terminal 10 corresponding to the buffer in which the discard of the uplink user data (block) occurs.

(Operation and Effects)

In the third embodiment, the scheduling unit 120a transmits the transmission rate control data only to the radio terminal 10 corresponding to the buffer in which the discard of the uplink user data (block) occurs.

Accordingly, it is possible to prevent from the decrease of the SG in the radio terminal corresponding to the buffer in which the discard of the uplink user data does not occur. Therefore, a decrease of the throughput in such radio terminal can be prevented.

Fourth Embodiment

Herein after, a fourth embodiment will be described with reference to the accompanying drawings. The following description is mainly given of differences between the second embodiment described above and the fourth embodiment.

Specifically, although not particularly described in the second embodiment, in the fourth embodiment, the wired transmission path established between the base station 100 and the radio network controller 200 is formed of a plurality of wired transmission paths. Each of the plurality of wired transmission paths corresponds to the radio terminal that establishes the E-DPDCH with the base station 100. When a plurality of E-DPDCHs is established between the radio terminal 10 and the base station 100, one radio terminal 10 may correspond to a specific wired transmission path being one of the plurality of wired transmission paths, or to the plurality of wired transmission paths.

(Configuration of Cell)

Figure 9:
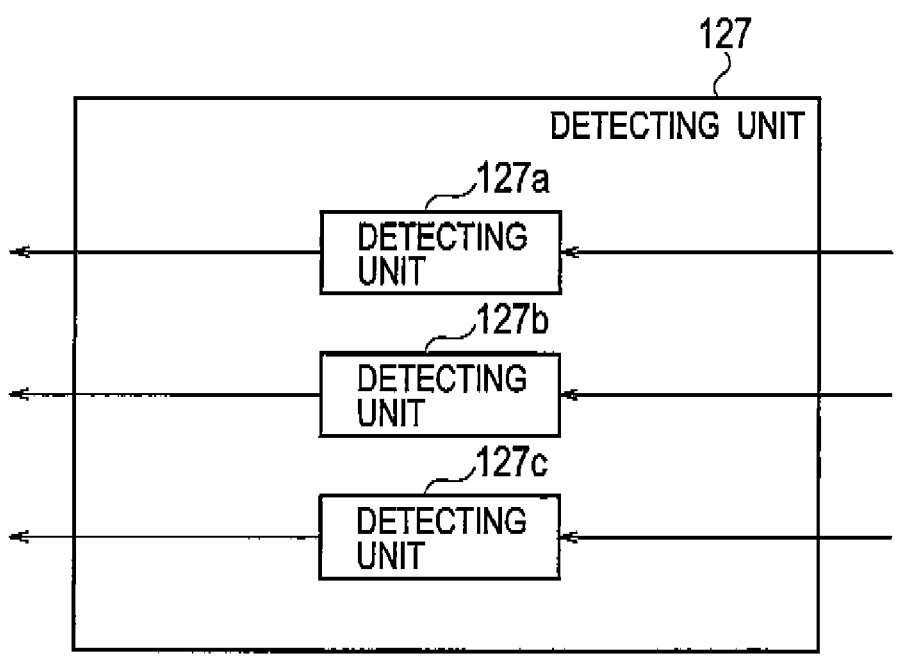
FIG. 9 is a block diagram showing a detecting unit 126 according to a fourth embodiment.

Hereinafter, description will be given of a configuration of the cell according to the fourth embodiment, with reference to the accompanying drawings. FIG. 9 is a block diagram showing the detecting unit 127 according to the fourth embodiment.

As shown in FIG. 9, the detecting unit 127 is formed of the plurality of detecting units (that is, detecting units 127a to 127c).

Each of the detecting units 127a to 127c corresponds to each of the plurality of the wired transmission paths, respectively. Each of the plurality of the wired transmission paths respectively corresponds to the radio terminal 10 that establishes the E-DPDCH with the base station 100.

Each of the detecting units 127a to 127c detects the discard of the uplink user data (block), for each of the plurality of wired transmission paths, in accordance with the congestion information received from the radio network controller 200. Each of the detecting units 127a to 127c notifies the scheduling unit 120a of the discard of the uplink user data (block), along with an identifier of the wired transmission path (or an identifier of the E-DPDCH, an identifier of the radio terminal 10, or the like) in which the discard of the uplink user data (block) occurs.

The above-described scheduling unit 120a transmits the transmission rate control data only to the radio terminal 10 corresponding to the wired transmission path in which the discard of the uplink user data (block) occurs.

(Operation and Effects)

In the fourth embodiment, the scheduling unit 120a transmits the transmission rate control data only to the radio terminal 10 corresponding to the wired transmission path in which the discard of the uplink user data (block) occurs.

Accordingly, it is possible to prevent the decrease of the SG in the radio terminal corresponding to the wired transmission path in which the discard of the uplink user data does not occur. Therefore, a decrease of the throughput in such radio terminal can be prevented.

Other Embodiments

The present invention has been described by use of the embodiments described above. However, it should be understood that the present invention is not limited to the description and drawings that constitute a part of this disclosure.

From this disclosure, various alternative embodiments, examples and operational techniques will be apparent to those skilled in the art.

For example, in the above-described second and fourth embodiments, the base station 100 transmits the transmission decrease data to the radio terminal when the congestion is generated in the wired transmission path, the congestion being detected by the discard of the uplink user data. However, the present invention is not limited to this. Specifically, the base station 100 may transmit the transmission rate decrease data to the radio terminal 100, when the congestion detected by the delay in the uplink user data is generated in the wired transmission path.

What is claimed is:

1. A radio communication system in which a radio terminal transmits uplink user data to a base station via an enhanced dedicated physical data channel and in which the base station transmits, to the radio terminal, transmission rate control data for controlling a transmission rate of the uplink user data, wherein the base station comprises:
a detecting unit configured to detect a discard of the uplink user data received from the radio terminal; and
a scheduling unit configured to count up a discard continuation counter for each predetermined period and to reset said discard continuation counter when the scheduling unit is notified of the discard of the uplink user data,
wherein the scheduling unit is configured to transmit transmission rate decrease data being the transmission rate control data instructing a decrease of the transmission rate assigned to the radio terminal, from an occurrence of the discard of the uplink user data until a value of the discard continuation counter reaches a discard continuation threshold.

2. The radio communication system according to claim 1, further comprising:
a buffer configured to store the uplink user data received from the radio terminal, wherein
the detecting unit detects the discard of the uplink user data stored in the buffer.

3. The radio communication system according to claim 1, further comprising:
a transmission unit configured to transmit the uplink user data to a network side via a wired transmission path; and
a receiving unit configured to receive, from the network side, congestion information indicating an occurrence of a congestion in the wired transmission path; wherein
the detecting unit detects the discard of the uplink user data in accordance with the congestion information.

4. The radio communication system according to claim 2, wherein
the buffer is formed of a plurality of buffers,
the scheduling unit transmits the transmission rate decrease data to the radio terminal corresponding to one of a plurality of buffers in which the uplink user data is discarded.

5. The radio communication system according to claim 3, wherein
the wired transmission path is formed of a plurality of wired transmission paths,
the scheduling unit transmits the transmission rate decrease data to the radio terminal corresponding to one of a plurality of wired transmission paths in which the uplink user data is discarded.

6. A radio communication method in which a radio terminal transmits uplink user data to a base station via an enhanced dedicated physical data channel and in which the base station transmits, to the radio terminal, transmission rate control data for controlling a transmission rate of the uplink user data, comprising:
detecting, at the base station, a discard of the uplink user data received from the radio terminal;
counting up a discard continuation counter for each predetermined period and resetting said discard continuation counter when a scheduling unit is notified of the discard of the uplink user data; and
transmitting, at the base station, transmission rate decrease data being the transmission rate control data instructing a decrease of the transmission rate assigned to the radio terminal from an occurrence of the discard of the uplink user data until a value of the discard continuation counter reaches a discard continuation threshold.

7. A base station that receives uplink user data from a radio terminal via an enhanced dedicated physical data channel, and transmits, to the radio terminal, transmission rate control data for controlling a transmission rate of uplink user data, comprising:
a detecting unit configured to detect a discard of the uplink user data received from the radio terminal; and
a scheduling unit configured to count up a discard continuation counter for each predetermined period and to reset said discard continuation counter when the scheduling unit is notified of the discard of the uplink user data, wherein
said scheduling unit is configured to transmit transmission rate decrease data being the transmission rate control data instructing a decrease of the transmission rate assigned to the radio terminal from an occurrence of the discard of the uplink user data until a value of the discard continuation counter reaches a discard continuation threshold.

8. The radio communication system according to claim 1, wherein data is discarded at least when an amount of uplink user data exceeds a buffer amount threshold.

9. The radio communication method according to claim 6, wherein data is discarded at least when an amount of uplink user data exceeds a buffer amount threshold.

10. The base station according to claim 7, wherein data is discarded at least when an amount of uplink user data exceeds a buffer amount threshold.

* * * * *